Figure 4:
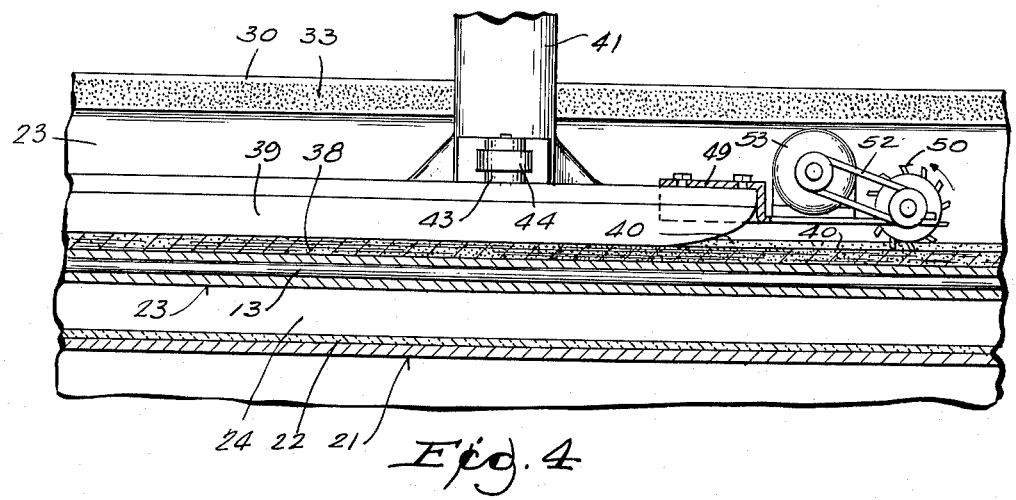

Feb. 8, 1966
E. O. McDONALD
3,233,556
OVERHEAD MONORAIL CAR
Filed Sept. 29, 1964
2 Sheets-Sheet 1
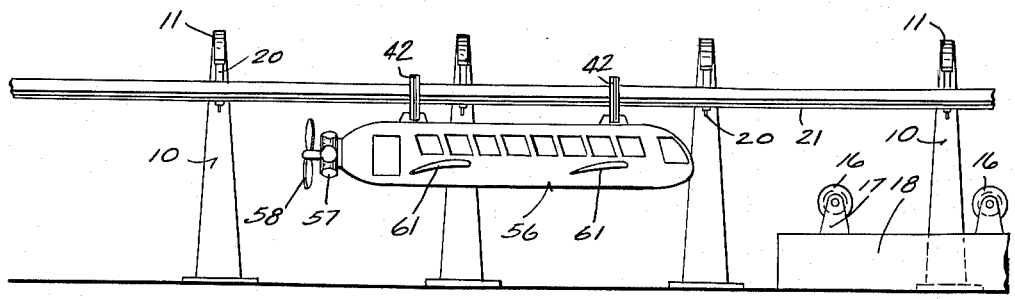
Fig.1
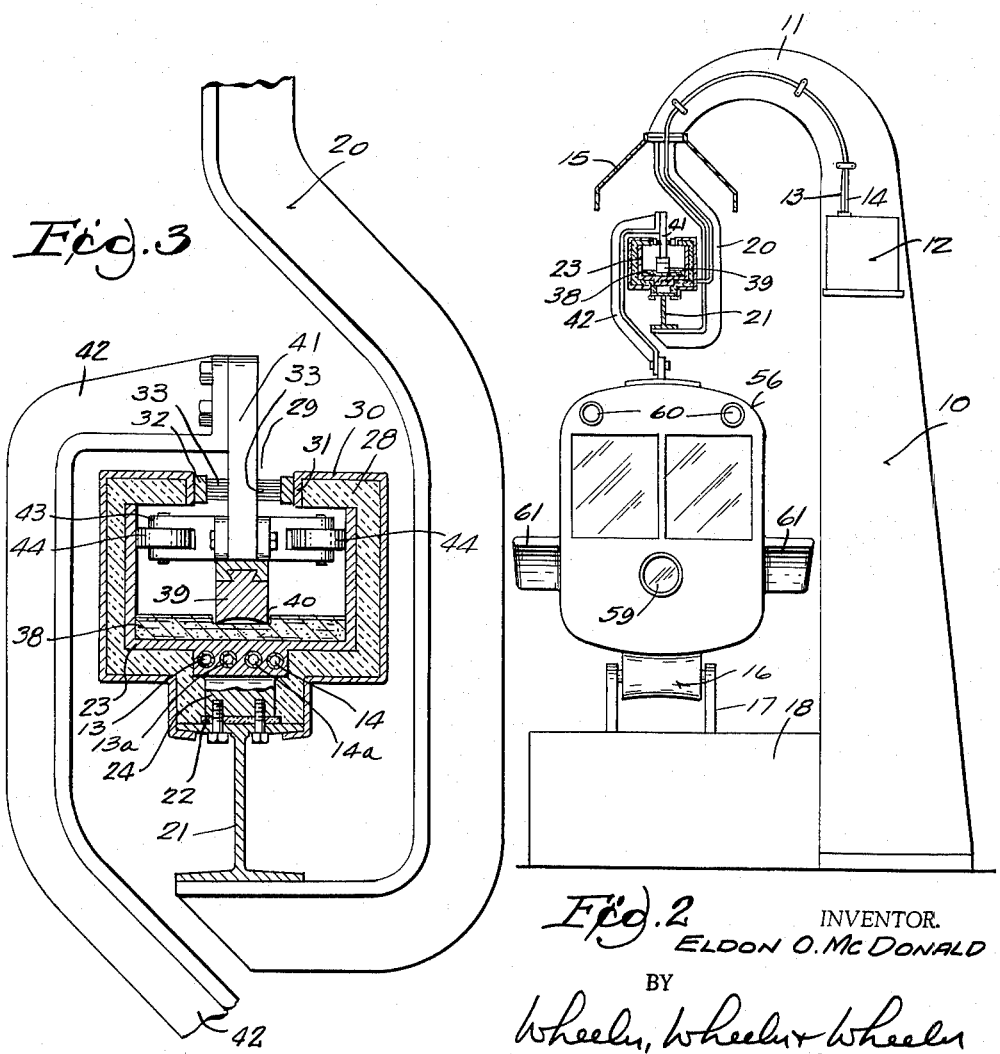
Fig.3
Fig.2
INVENTOR.
ELDON O. McDONALD
BY
Wheeler, Wheeler & Wheeler
ATTORNEYS Feb. 8, 1966  E. O. McDONALD  3,233,556
OVERHEAD MONORAIL CAR Filed Sept. 29, 1964  2 Sheets-Sheet 2

INVENTOR.
ELDON O. McDONALD
BY
Wheeler, Wheeler & Wheeler
ATTORNEYS

United States Patent Office 3,233,556
Patented Feb. 8, 1966

3,233,556
OVERHEAD MONORAIL CAR
Eldon O. McDonald, 3553 S. Moorland Road,
New Berlin, Wis.
Filed Sept. 29, 1964, Ser. No. 399,985
6 Claims. (Cl. 104—136)

This invention relates to improvement in monorail transportation structures, in which a car is suspended from runners sliding on a layer of ice in an overhead track structure.

A sufficient number of overhead monorail transport systems are in use to show that suspended cars are quite satisfactory and are less sensitive to minor variations in track structure than is true of other high speed transportation systems so that the cars give a good feeling of security at high speed. Problems in use of monorail systems are usually considered to be the reduction of friction between the track and car wheels or other supporting means to a very low value, the reduction of side sway of the cars, and maintenance of a smooth car-supporting surface of the track.

The present invention takes advantage of the fact that layers of ice of large areas can be readily and economically produced, that a layer of ice can be frozen to a surface smooth and level to a high degree, that a runner in the nature of an ice skate bearing on ice actually moves on a layer of water on the ice so that friction is minimized, that the formation of the water layer can be controlled by control of the runner pressure on the ice, and that the layer of ice can readily be restored to its initial condition after passage of loaded runners thereon.

Figure 5:
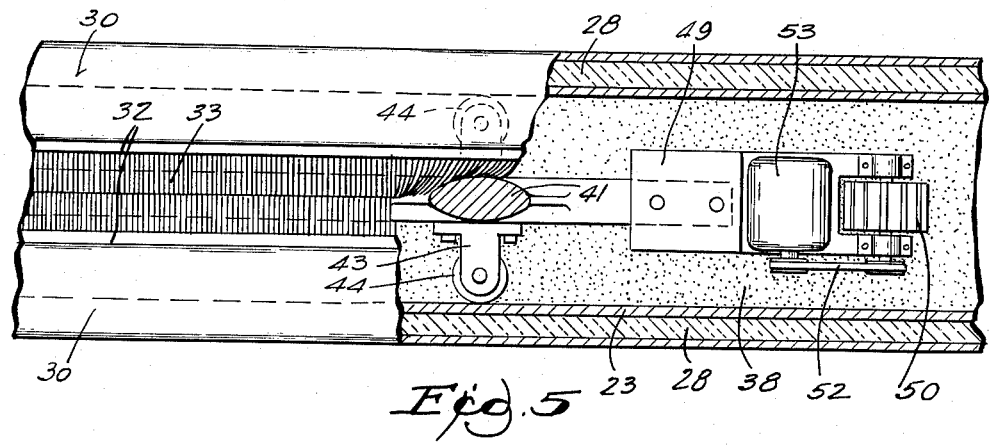
Figure 6:
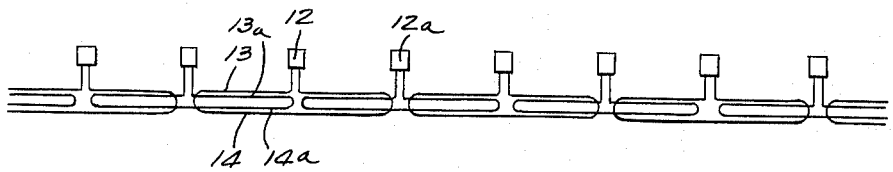

In the drawings:

FIG. 1 illustrates the portion of an overhead monorail track with a car suspended therefrom, according to the present invention, and means supporting the car at standstill, FIG. 2 is a cross section of a track structure and a head-on view of a car suspended therefrom but resting on a support roller, FIG. 3 is an enlarged cross section view of the track trough and car supporting structure shown in FIG. 2, FIG. 4 is a longitudinal cross section of a fragment of a track trough and a portion of the car supporting means coacting therewith, FIG. 5 is a top plan view of a fragment of track trough with portions broken away to show some of the car supporting means, and FIG. 6 is a diagram showing each track section provided with two independent refrigerant circuits to assure that the track ice will be kept frozen.

Generally, a series of pillars are formed with their upper ends bent over to support a track structure on and in which a runner slides to support a car suspended therefrom. The track structure is generally in the form of a heat conductive trough open at the top and substantially enclosed by a heat insulating jacket having a slotted top. The slot is provided with closure means opened by movement therethrough of car supporting means moving along the track, and automatically closing behind the car supporting means. The track is refrigerated so that a layer of ice is maintained in the bottom thereof and the ice is grooved to receive and tend to hold a number of sliding runners in tandem, the runners having side wheels rolling along the inner sides of the track trough. The car is in the form of an aero-dynamic body driven by an internal combustion engine operating a propeller, and the body has wings sufficient to provide lift at the usual running speed to compensate for a substantial portion of the weight of the empty car and its running gear. The car is generally of the light construction used in manufacture of airplanes but has a "backbone" and partial ribs for distributing the weight along the car from the attachment points for runners. Pneumatic rollers of relatively large diameter and with flexible casing are provided to relieve the ice from at least a major portion of car weight when it is at a standstill at stations and the like.

Referring specifically to the drawing, 10 designates pillars of a suitable construction with a bent-over upper portion 11 to bring the upper ends of the pillars approximately above the center line of a track structure supported by the pillars. The pillars 10 may be of any form shown by engineering data to be adapted to hold the track in proper position with sufficient rigidity. Numeral 12 designates a known kind of refrigeration unit in a suitable weatherproof enclosure with a refrigerant supply pipe 13 and a return pipe 14 running along the pillar portion 11 to the track structure and adapted to circulate refrigerant through a part of the track structure. Because the top of the track structure could collect rain, dust, sleet, etc., it is desirable to mount a roof 15 extending laterally over the track structure to both sides sufficiently to shed rain and the like beyond the track. In each station or other location where the car is to be at a standstill, means are provided for supporting at least a substantial portion of the car weight to relieve the runner pressure on the ice. Rollers 16 of relatively large size and with soft casing are adapted to be pneumatically inflated and mounted on trunnions 17 on a platform 18. The rollers, when inflated, are of such size as to allow for variations of several inches in the roller radius which makes the rollers automatically adjustable in height to that extent. The casings are quite soft so that the rollers will conform to the contour of the portion of the car bearing thereon and will hold the car firmly against side sway as it is being loaded and unloaded.

The track structure includes a bracket 20 attached to each pillar and shaped so that its lower end comes approximately on the center line of the track structure to be supported thereby. A beam 21 is mounted on the brackets and forms a continuous base to support the track against any possibility of sagging. The track structure itself comprises a layer 22 of solid heat insulation placed on top of the beam to reduce heat flow to the track from the beam. A trough-like member 23 of heat conductive material, is made with a foot section 24 of approximately the width of the insulation strip 22, the foot section being provided with a number of pairs of ducts 13, 14 through which refrigerant flows from and returns to the refrigeration unit 12 to cool the track trough 23. Each pair of ducts 13, 14 (and 13a, 14a in FIG. 6) are connected to a refrigerating machine and the machines are at such spacing that the surface of the track trough 23 above the refrigerant ducts, is kept well below the freezing point of water therein.

FIG. 6 shows refrigerating unit 12 as having ducts 13 and 14 extending through the track structure from each side of the refrigerating unit and overlapping with ducts 13a and 14a from the adjacent refrigerating unit 12a. Thus each track section includes two separate refrigerant circuits each of which is adequate to keep the water frozen if the adjacent unit should fail. Obviously the length of each refrigerant circuit and the degree of overlapping of circuits required, depends on the size and reliability of the refrigerating units.

A heat insulation jacket 28 is formed around the track trough 23 except for a slot 29 in the jacket top on the center line of the track and such insulation is sheathed as shown at 30 for protection against weather and mechanical damage. It will be understood that heat insulation 28 may be in layers and that sheath 30 may be in pieces other than as shown, for simplicity in mounting and removal for maintenance of track parts. The insulation should be sufficient to keep heat flow into the water in the track trough 23 well within the capacity of the number of refrigerating machines 12 used for keeping water in the track frozen.

It will be noted that the sheath 30 is turned into the slot 29 to define the side walls of such slot by flanges 31 therein. Such flanges are used for mounting of means for substantially closing the slot to prevent entry of foreign material while permitting the slot to be opened upon car movement. The closing means is indicated as being in the form of strips 32 of fabric or plastic from which are extended long flexible and resilient fibers 33 of synthetic resin such as are used for guard hairs in making an imitation fur from a high pile synthetic resin fabric. The fibers 33 of opposite strips interlace so that the slot 29 is substantially closed most of the time. As the runner comes along the track, the fibers are parted but the fibers spring back and interlace and, in so doing, re-close the track slot immediately after passage of the car runner. Instead of using interlacing fibers as above described, it is possible to use strips of elastic material biased toward one another, which are made to overlap and close the slot and are capable of parting as the runner comes along the track in contact with the edges of such strips. Such strips may extend upward at an angle and serve to shed rain, etc. otherwise passing through the slot into the track trough.

The track trough 23 retains water which is frozen into a layer of ice 38 by refrigerant in ducts 13, 14. Hollow ground runners 39 of substantial length and in tandem slide on the ice and in a channel 40 therein formed by means mounted on the leading runner. Each runner has attached thereto stems 41 of rounded cross sections where they pass through the slot closing means 32, 33 and such stems extend sufficiently above the top of the track structure for attachment thereto of hangers 42 for supporting the car. To the sides of each of the stems 41, are attached two mountings 43 in which rotatable wheels 44 are severally mounted for rolling on the sides of the track trough 23. Such wheels preferably have resilient tires of such size that they are under some compression when in use and resiliently center the runners 39 in the ice channel 40. Thus coaction of the ice channel and the wheels limits sideward movement of the runner regardless of the lateral forces acting on the car.

The ice channel 40 is formed and is kept to dimension by a rotary cutter acting ahead of the leading runner for each car. A bracket 49 on the leading runner rotatably supports a cutter 50 to cut a channel 40 of given depth below the bracket. The cutter 50 is connected by belt 52 to power driving means 53 which is preferably an electric motor powered from a source of electricity on the car. The cutter keeps the bottom of the channel to a given level and will remove any high spots on the sides of the channel. Obviously, the first car over a section of track after a length of time sufficient for water and ice chips to freeze in the ice channel, will be run at a lower speed than cars following at relatively short intervals, to allow the cutter 50 sufficient time to cut a smooth channel. It will be seen that the cutter 50 rotates counter-clockwise to throw out of channel 40 any ice chips or other material interferring with the smoothness of the channel bottom and sides.

A car 56 is shown in FIGS. 1 and 2 as being suspended by way of two hangers 42 from two runners 39 operating in tandem and the car has an aerodynamic shape and is preferably of light but rigid construction. The car is preferably driven by an internal combustion engine 57 rotating an adjustble propeller 58, the engine also driving a generator for lights such as headlight 59 and running lights 60, and for cutter motor 53. It is preferred to provide the car with fore and aft wings 61 which are short but coact in providing sufficient aero-dynamic lift to compensate at the usual running speed for approximately 90% of the weight of the empty car and its runners. Thus the chief weight on the runners will be that of the operator and passengers and the runner contact surfaces on the ice are calculated to support such weight without substantial melting of ice even when the car is unloading and loading in a station. However the stations will preferably be equipped with relatively large and soft pneumatic rollers to bear against the lower surface of the car when it is standing in a station and thereby relieve the pressure of the runners on the ice, thus preventing the melting of low spots into the ice at such points. Obviously, the internal combustion engine and propeller may be replaced by jet-reaction engines, etc., if desired, but means other than the adjustable propeller must then be used to slow down the car upon approach to tne station.

I claim:

1. In an overhead monorail transport structure, a track comprising a series of spaced pillars, and a water-retaining trough connecting and supported on the pillars and having heat conductive walls with ducts therein for flow of refrigerant to freeze the water into a layer of ice in the trough; a car running on the track and comprising runners sliding on the ice in the track trough, a car body supported on the runners and suspended below the track, and means on the car for producing a forward thrust thereon by reaction on the air behind the car; and plural refrigerating units severally mounted on the pillars for maintaining flow of refrigerant throughout the trough ducts.

2. The structure of claim 1 in which a heat insulating jacket substantially encloses the track trough and has a slot thereon above the trough, a stem on each of the runners for extending upwardly through the insulating jacket slot, and a hanger mounted on each of the stems and extending below the track trough for suspension of the car therefrom.

3. The structure of claim 1 in which resilient rollers are provided for bearing a substantial portion of the car weight in locations where the car is at standstill and to hold the car against side sway during loading.

4. The structure of claim 2 in which the runners are in tandem, and a power-driven rotary cutter extends forward from the leading runner for cutting a groove in the layer of ice for sliding of the runners therein.

5. The structure of claim 2 in which wheels extend laterally from the runners to the track trough side walls for aiding in centering the runners in the trough.

6. The structure of claim 2 in which resilient means extend laterally into the slot for overlapping and to be parted by the movement of the runner stems and to substantially close the slot after passing of the runner stems.

No references cited.

ARTHUR L. LA POINT, *Primary Examiner.*